(12) United States Patent
Liu et al.

(10) Patent No.: US 7,153,050 B2
(45) Date of Patent: Dec. 26, 2006

(54) COLLAPSIBLE KEYBOARD

(75) Inventors: Chia-Hung Liu, Taipei Hsien (TW); Kuo-Chiang Chin, Taoyuan County (TW)

(73) Assignee: Darfon Electronics Corp., Taoyuan (TW)

( * ) Notice: Subject to any disclaimer, the term of this patent is extended or adjusted under 35 U.S.C. 154(b) by 0 days.

(21) Appl. No.: 11/116,491

(22) Filed: Apr. 28, 2005

(65) Prior Publication Data

US 2005/0258021 A1 Nov. 24, 2005

(30) Foreign Application Priority Data

May 21, 2004 (TW) .............................. 93114370 A

(51) Int. Cl.
*B41J 11/56* (2006.01)
*B41J 29/06* (2006.01)

(52) U.S. Cl. ............... 400/682; 400/679; 400/680; 361/680; 361/683

(58) Field of Classification Search ........ 400/679–685, 400/691, 693, 717; 361/680, 683
See application file for complete search history.

(56) References Cited

U.S. PATENT DOCUMENTS

| 5,746,410 A * | 5/1998 | Hung ....................... 248/441.1 |
| 6,798,649 B1 * | 9/2004 | Olodort et al. ............. 361/683 |
| 2004/0001047 A1 * | 1/2004 | Wang ......................... 345/168 |

* cited by examiner

*Primary Examiner*—Judy Nguyen
*Assistant Examiner*—N. Ha
(74) *Attorney, Agent, or Firm*—Quintero Law Office

(57) ABSTRACT

A collapsible keyboard comprises a connection part, a top cover pivoted to the connection part, a first key assembly connected to the connection part and movable between a first position and a second position, and a second key assembly pivoted to the first key assembly. The first key assembly is located at the first position when the collapsible keyboard is in an operating mode, and the second key assembly is located between the first key assembly and the top cover and the first key assembly is located at the second position when the collapsible keyboard is in a collapsed mode.

14 Claims, 9 Drawing Sheets

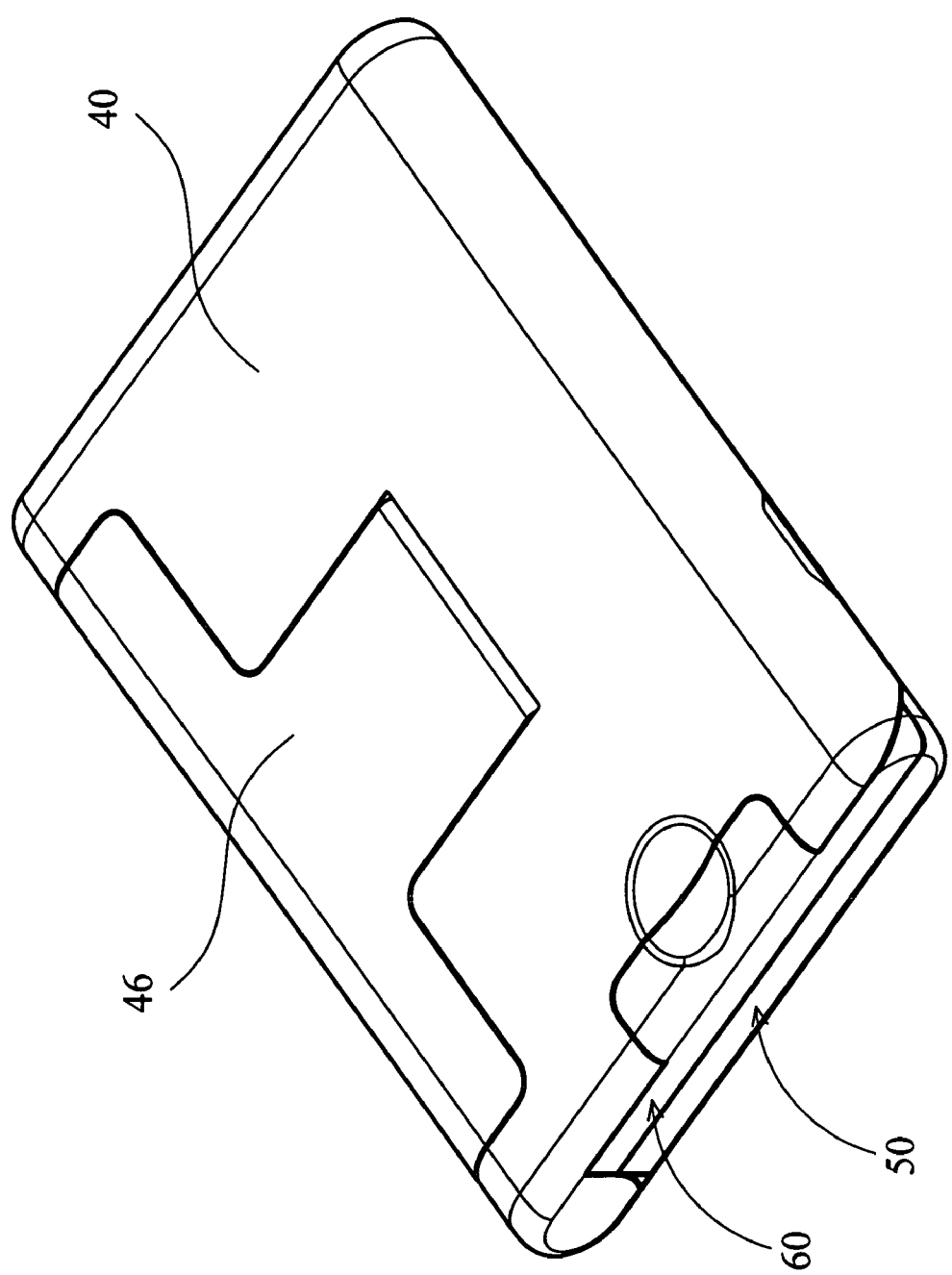

COLLAPSIBLE KEYBOARD

BACKGROUND

The invention relates to a keyboard, and in particular to a collapsible keyboard.

FIG. 1 is a schematic view of a conventional bi-fold keyboard 10. The keyboard 10 comprises a left key part 12, a right key part 14, a shaft 16 and a bracket 18 connected to the left key part 12. The left key part 12 is pivoted to the right key part 14 via the shaft 16. When the left key part 12 and the right key part 14 are folded together via the shaft 16 into a received mode, the size of the folded keyboard 10 is only reduced by half.

The bracket 18 connected to the left key part 12 (or the right key part 14) serves as a support for a portable electronic device, e.g. personal digital assistant (PDA). Typically, the electronic device supported by the bracket 18 must be moved to a central region 18' of the keyboard 10 to be viewable. It is difficult, however, to position the bracket 18 at the center of the unfolded keyboard 10.

FIG. 2 is another schematic view of a conventional quad-fold collapsible keyboard 20. The keyboard 20, comprising a first part 22a, a second part 22b, a third part 22c and a third part 22d can be folded by the method depicted in FIG. 1B. The folded keyboard 20, however, is very thick, and several keys 24 between the second part 22b and the third part 22c, project outwardly and are easily damaged when the keyboard 20 is folded.

SUMMARY

The invention provides a collapsible keyboard with a thin profile that can be conveniently carried and stored.

A collapsible keyboard comprises a connection part, a top cover pivoted to the connection part, a first key assembly connected to the connection part and movable between a first position and a second position, and a second key assembly pivoted to the first key assembly. The first key assembly is located at the first position when the collapsible keyboard is in an operating mode, and the second key assembly is located between the first key assembly and the top cover and the first key assembly is located at the second position when the collapsible keyboard is in a collapsed mode.

In the preferred embodiments, the first key assembly comprises a plurality of first keys and the second key assembly comprises a plurality of second keys. The first key assembly comprises a first edge irregularly formed by the first keys and the second key assembly comprises a second edge irregularly formed by the second keys and complementary to the first edge, wherein the first keys of the first edge E1 alternately correspond to the second keys of the second edge. The second keys face the first keys when the collapsible keyboard is in the collapsed mode.

The connection part comprises a first slot and the first key assembly comprises a rib disposed in the first slot, so that the first key assembly is movable between the first position and the second position. The connection part comprises a hook and the second key assembly comprises a connecting portion, and the hook is engaged with the connecting portion for positioning the second key assembly when the collapsible keyboard is in the operating mode.

The top cover comprises a protrusion and the first key assembly comprises a second slot, and the protrusion is slidably engaged with the second slot when the second key assembly is located between the first key assembly and the top cover. The first key assembly comprises a first notch and the second key assembly comprises a second notch, and the first notch correspond the second notch when the first key assembly is disposed on the second key assembly.

The collapsible keyboard of the invention can be conveniently carried and stored, and the bi-fold collapsible keyboard has a thickness smaller than the conventional quadfold collapsible keyboard. Further, the design of the top cover 40 is suitable for supporting the PDA or different electronic devices and protecting the keys from damage and accumulation of dust.

DESCRIPTION OF THE DRAWINGS

The invention can be more fully understood by reading the subsequent detailed description and examples with references made to the accompanying drawings, wherein:

FIG. 7 is a perspective view of the collapsible keyboard of the invention in a collapsed mode.

DETAILED DESCRIPTION

Figure 1:
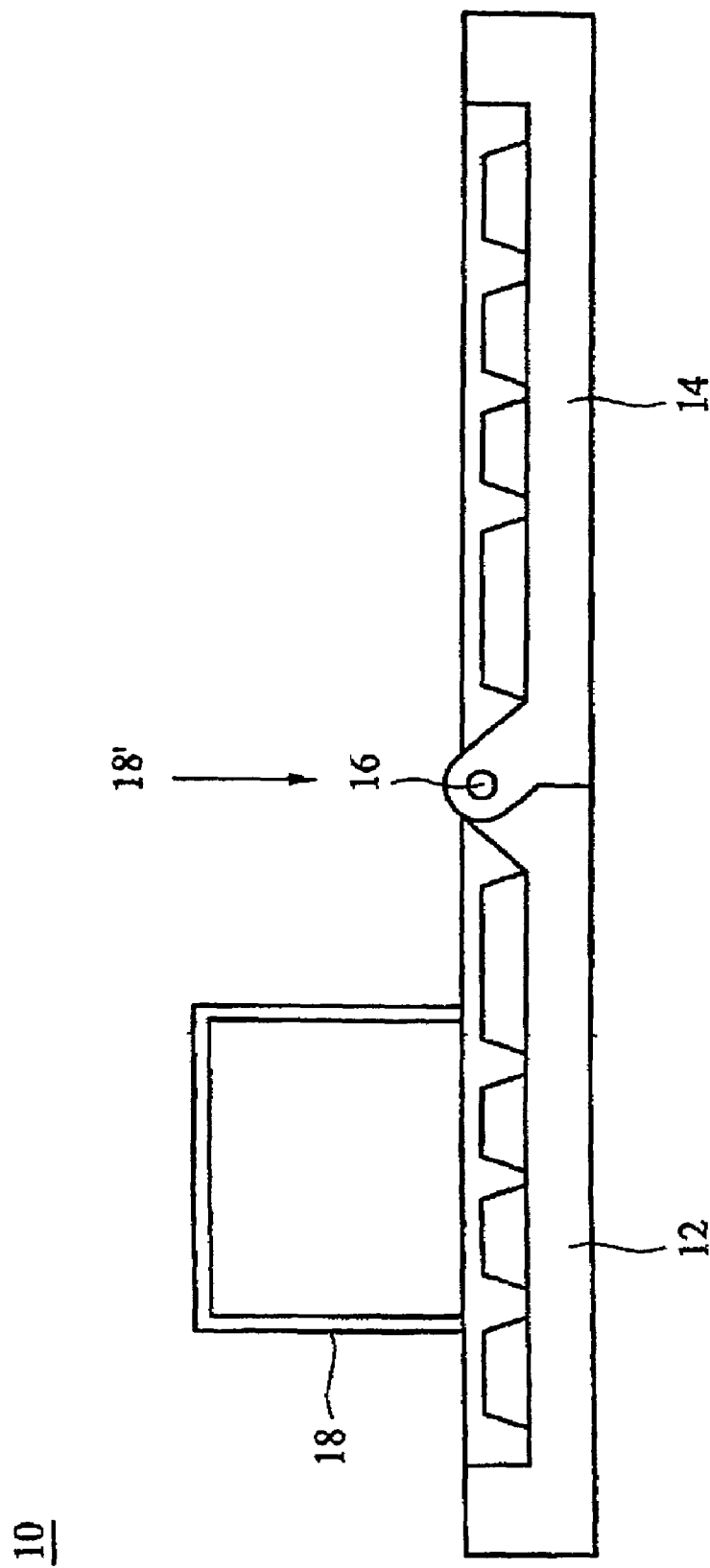
FIG. 1 is a schematic view of a conventional collapsible keyboard.
Figure 2:
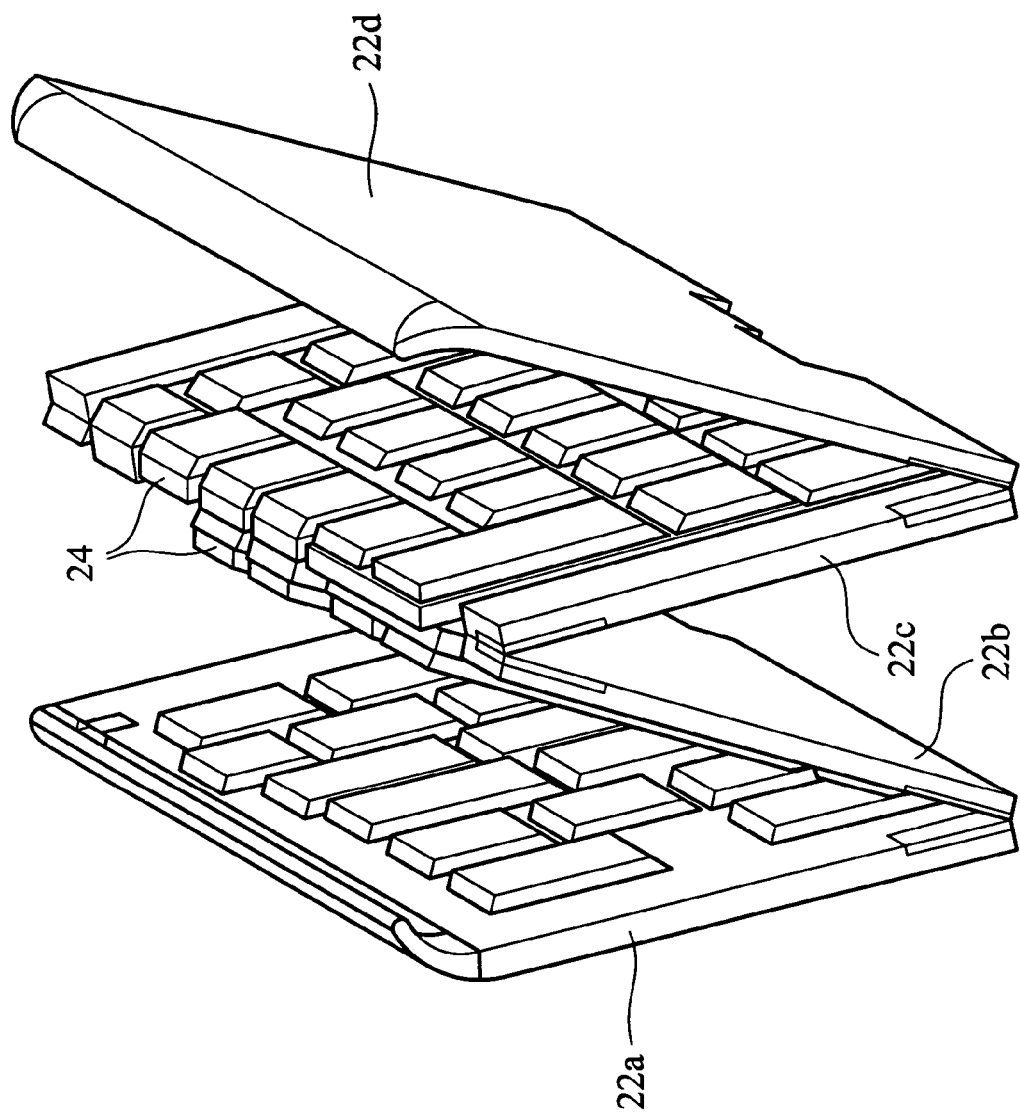
FIG. 2 is another schematic view of a conventional collapsible keyboard.
Figure 3A:
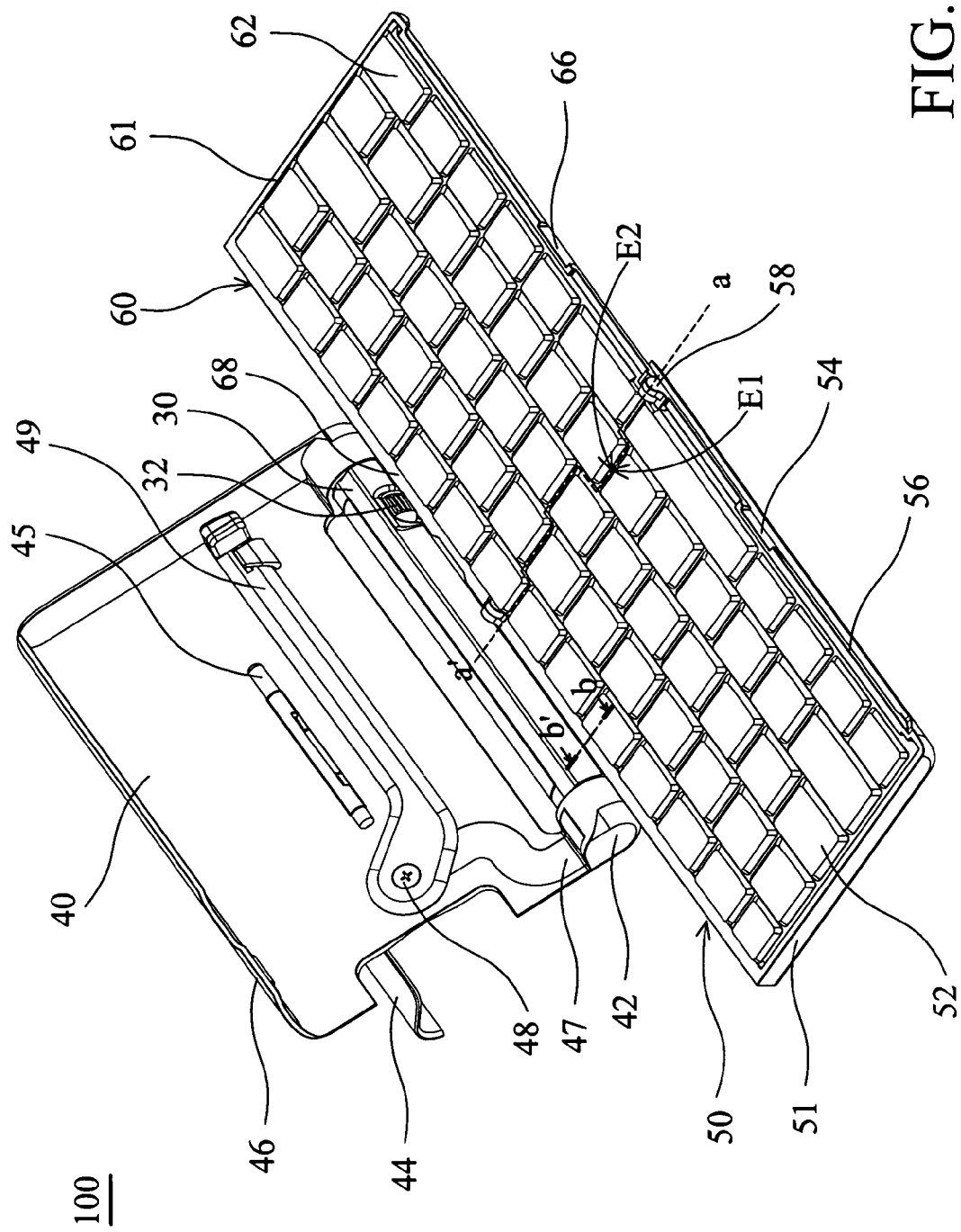
FIG. 3A is a perspective view of a collapsible keyboard of the invention in an operating mode.

In FIG. 3A, a collapsible keyboard 100 of the invention is situated in an operating mode, i.e., the same mode of a conventional keyboard. The collapsible keyboard 100 comprises a connection part 30, a top cover 40 pivoted to the connection part 30, a first key assembly 50 connected to the connection part 30 and movable between a first position and a second position, a shaft 42, a supporting plate 44, a shaft 45, a shaft 58, and a second key assembly 60 pivoted to the right side of the first key assembly 50 by the shaft 58.

When the collapsible keyboard 100 is in an operating mode, the first key assembly 50 is located at the first position and the second key assembly 60 is located between the first key assembly 50 and the top cover 40, and the first and second key assemblies 50 and 60 are substantially located on the same level. When the collapsible keyboard 100 is in a collapsed mode, the second key assembly 60 is disposed on the first key assembly 50 and the top cover 40 is engaged with the first and second key assemblies 50 and 60. Thus the first key assembly 50 is located at the second position with respect to the connection part 30.

The first key assembly 50 comprises a first housing 51 and a plurality of first keys 52 disposed on the first housing 51. The second key assembly 60 comprises a second housing 61 and a plurality of second keys 62 disposed on the second housing 61. The first key assembly 50 comprises a first edge E1 irregularly formed by the first keys 52 and the second key assembly 60 comprises a second edge E2 irregularly formed by the second keys 62 and complementary to the first edge E1. The first keys 52 of the first edge E1 alternately correspond to the second keys 62 of the second edge E2, separated by a dotted line a–a'.

Figure 3B:
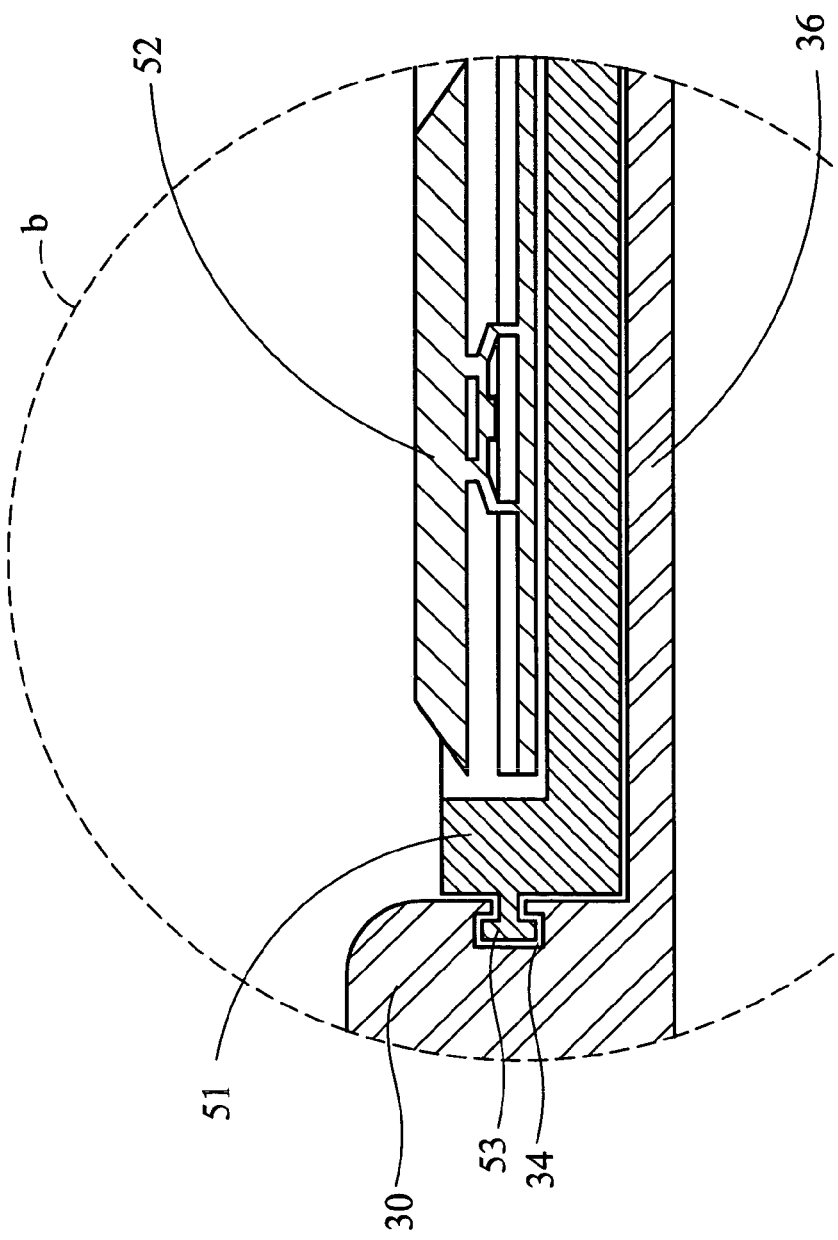
FIG. 3B is a sectional view of the collapsible keyboard along line (b–b') of FIG. 3A.

In FIGS. 3A and 3B, the connection part 30 comprises a first slot 34 and the first key assembly 50 comprises a rib 53 disposed in the first slot 34, so that the first key assembly 50 is movable between the first position and the second positions.

When the collapsible keyboard 100 is in an operating mode FIG. 3A, the first key assembly 50 is located at the first position with respect to the connection part 30, and the first and second key assemblies 50 and 60 are substantially located on the same level.

The connection part 30 comprises a hook 32 and the second key assembly 60 comprises a connecting portion 68. The hook 32 is engaged with the connecting portion 68 for positioning the second key assembly 60 when the collapsible keyboard 100 is in the operating mode.

In FIG. 3A, the top cover 40 is pivoted to the connection part 30 by the shaft 42, and the top cover 40 is pivoted to the supporting plate 44 by the shaft 45. When the collapsible keyboard 100 is in the operating mode, the top cover 40 is supported by the supporting plate 44 with an inclined angle, to support a portable electronic device 70, e.g. PDA, having an infrared receiver 71.

The top cover 40 comprises a circuit 47, an adjusting bar 49 and an infrared receiver/emitter 491. The circuit 47 is electrically connected to a keyboard control circuit in the first key assembly 50 (not shown in Figs.) and the infrared receiver/emitter 491. The adjusting bar 49 comprises two ends. One end of the adjusting bar 49 is rotatably disposed on the top cover 40, and the infrared receiver/emitter 491 is disposed on the other end of the adjusting bar 49.

Figure 3C:
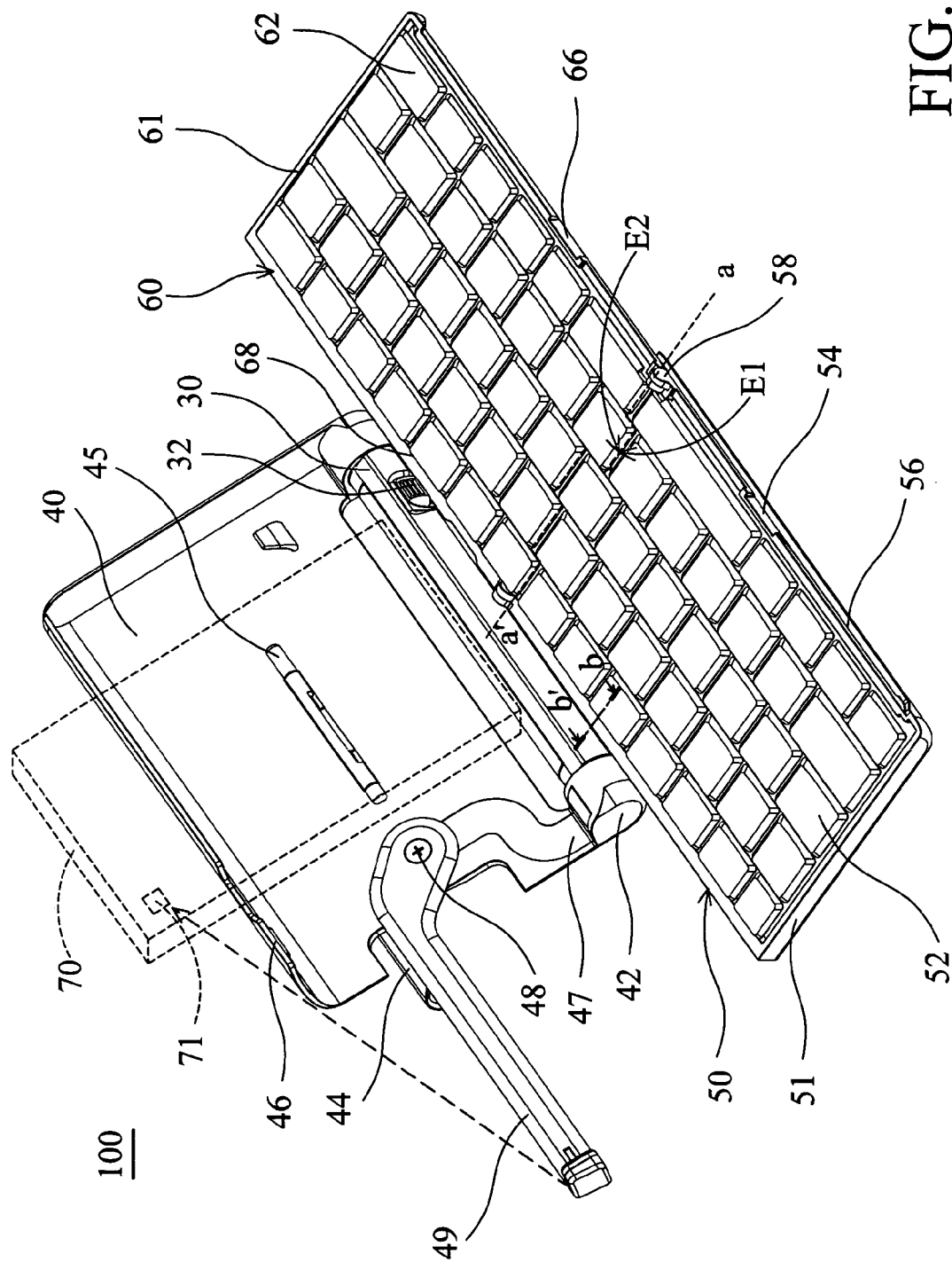
FIG. 3C is a schematic view of the collapsible keyboard of the invention incorporated with a portable electronic device.

When a user operates the collapsible keyboard 100 and moves the adjusting bar 49 to a predetermined position as shown in FIG. 3C, signals from the keyboard control circuit are transmitted to the infrared receiver 71 of the portable electronic device 70 via the infrared receiver/emitter 491.

Figure 4:
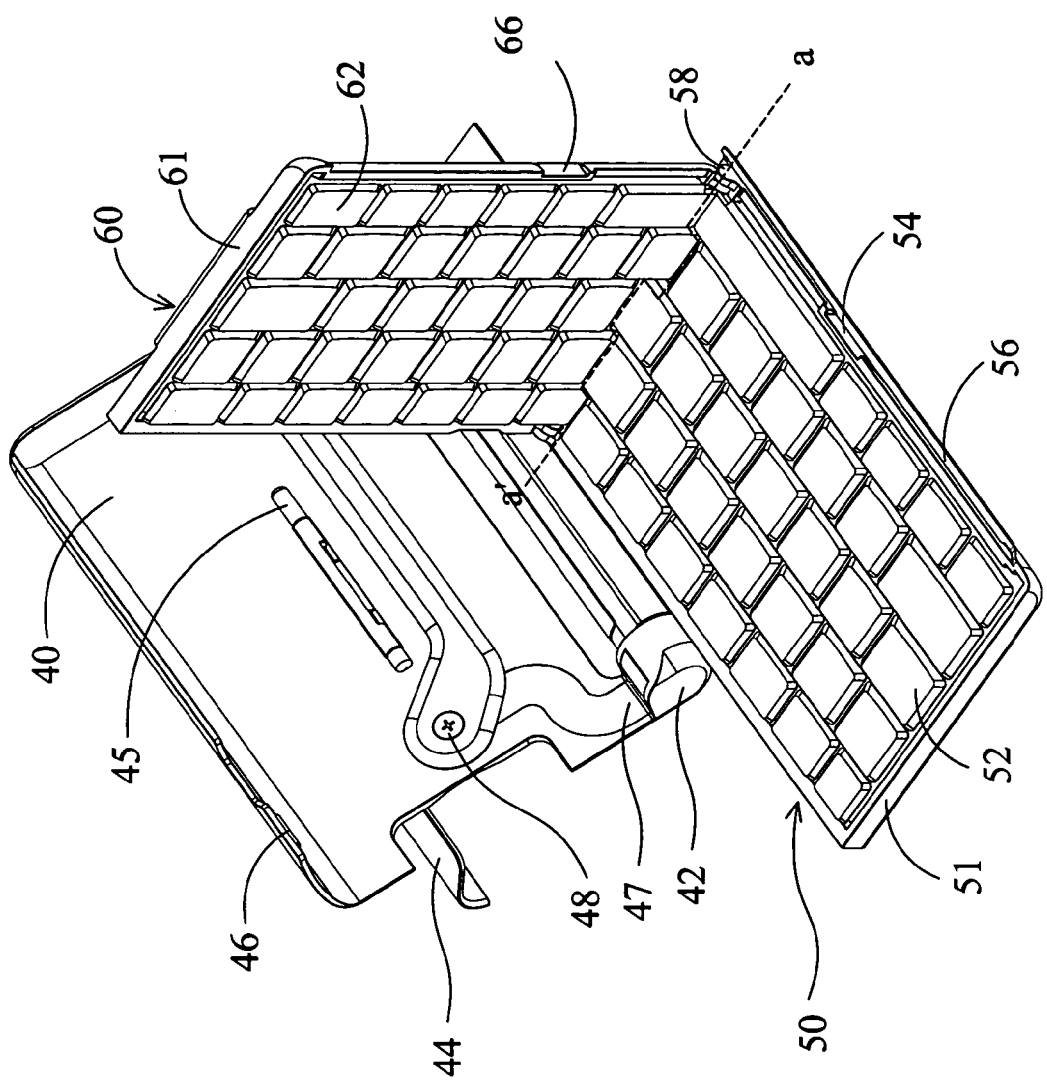
FIG. 4 is a perspective view of the collapsible keyboard in another operating mode.
Figure 5:
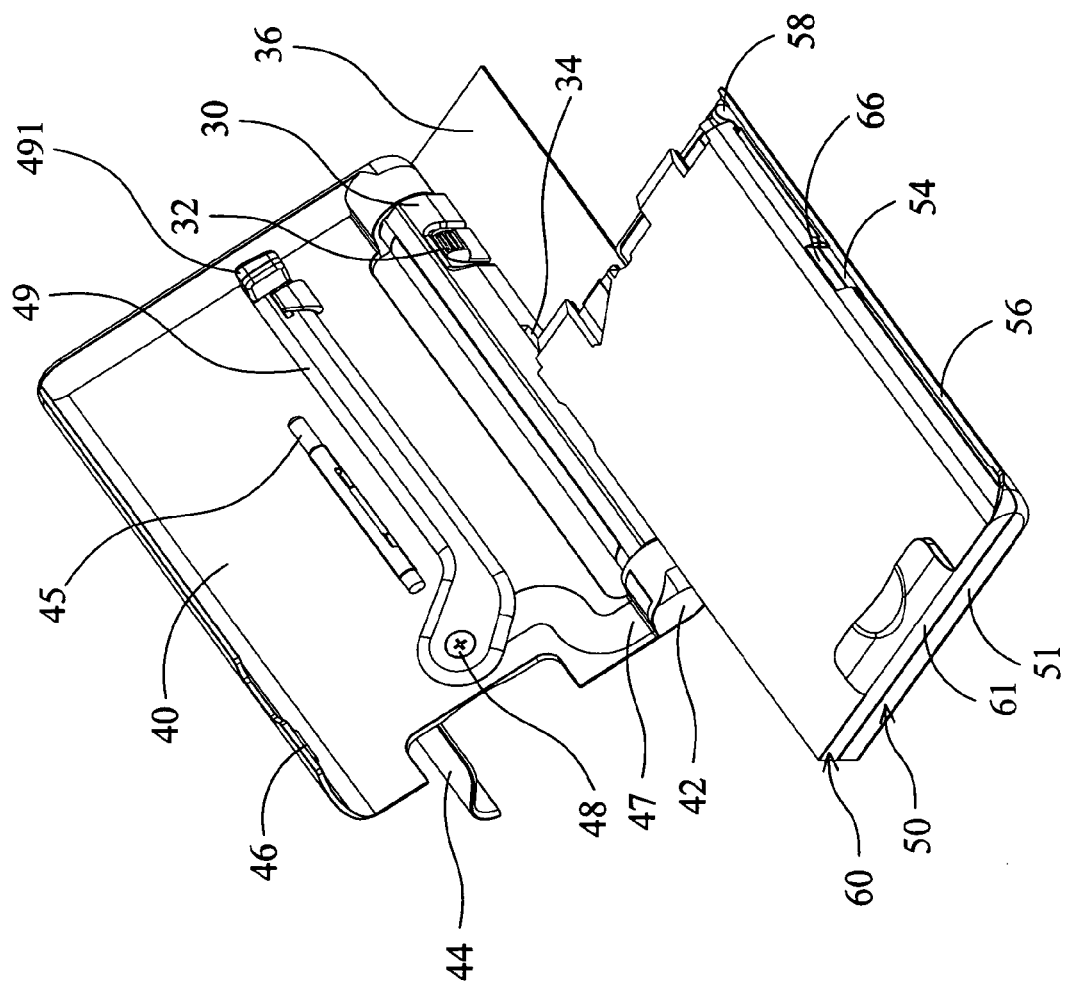
FIG. 5 is a perspective view of a second key assembly disposed on a first key assembly of the collapsible keyboard.

In FIGS. 4 and 5, by folding the first key assembly 50 toward the second key assembly 60, i.e., operating the collapsible keyboard 100 from the operating mode to the collapsed mode, the first keys 52 of the first key assembly 50 face the second keys 62 of the second key assembly 60.

The top cover 40 further comprises a protrusion 46, the first key assembly 50 further comprises a first notch 54 and a second slot 56 connected to the first notch 54, and the second key assembly 60 further comprises a second notch 66.

Figure 6:
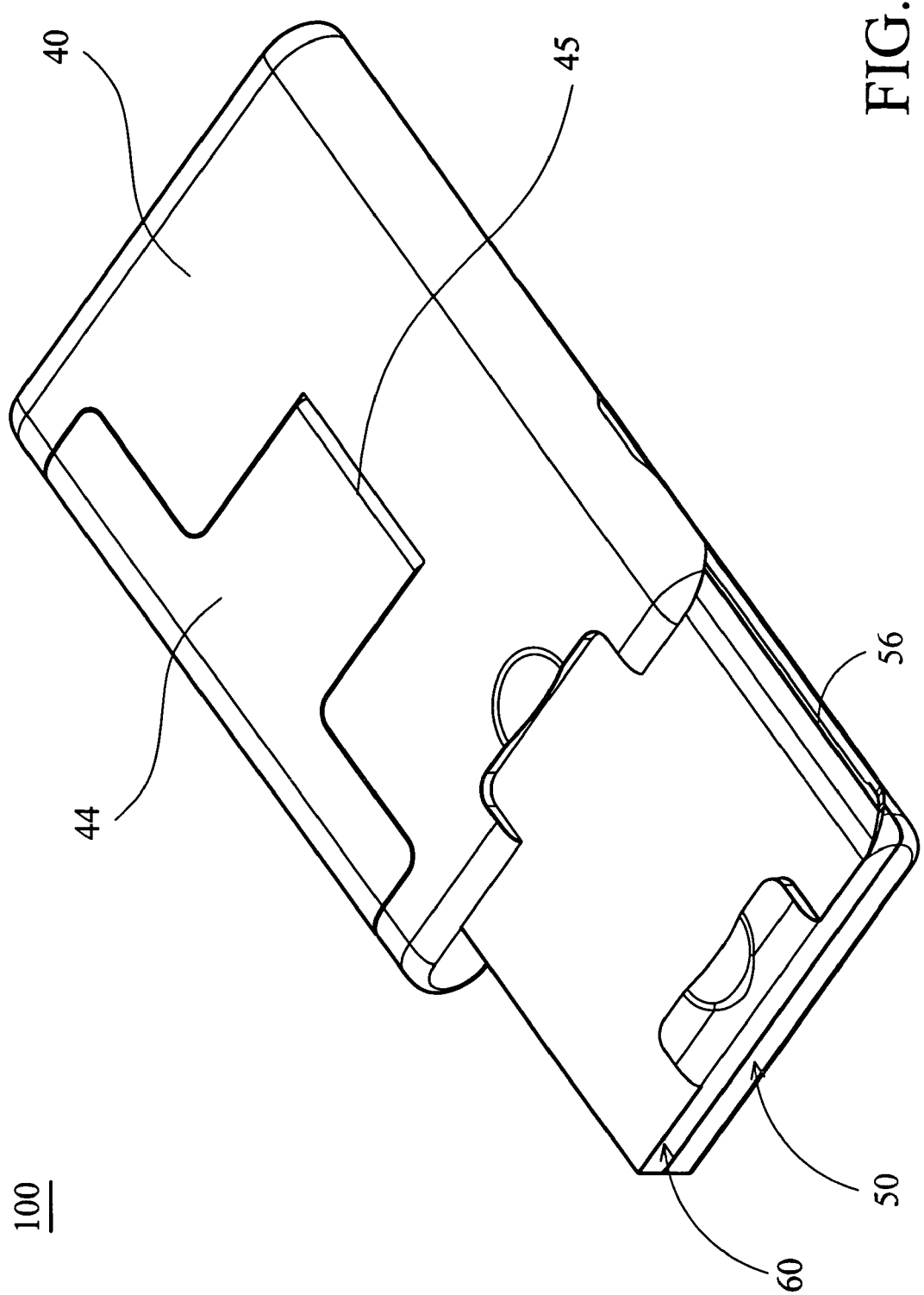
FIG. 6 is a perspective view of a top cover of the collapsible keyboard being closed.

In FIG. 6, when the second key assembly 60 is disposed on the first key assembly 50, the first notch 54 corresponds the second notch 66, to allow the protrusion 46 of the top cover 40 to pass through the second and first notches 66 and 54 to enter the second slot 56. Thus, the protrusion 46 of the top cover 40 engaged with the second slot 56 is horizontally moved along the second slot 56.

FIG. 7 is a perspective view of the collapsible keyboard of the invention in a collapsed mode. When the protrusion 46 of the top cover 40 is engaged with the second slot 56, the second key assembly 60 is located between the first key assembly 50 and the top cover 40. With the engagement of the rib 53 and the first slot 34 and the engagement of the protrusion 46 and the second slot 56, the first and second key assemblies 50 and 60 are slidably moved and received in the top cover 40, and thus the first key assembly 50 is located at the second position with respect to the connection part 30

On the other hand, when performing the collapsible keyboard 100 from the collapsed mode (FIG. 7) to the operating mode (FIG. 3A), the user has to pull the first and second key assemblies 50 and 60 out, to open the top cover 40, and finally to extend the second key assembly 60 to the second position.

The collapsible keyboard 100 of the invention can be conveniently carried and stored, and the bi-fold collapsible keyboard 100 is less thick than the conventional quad-fold collapsible keyboard. Further, the design of the top cover 40 is suitable for supporting the PDA or different electronic devices and protecting the keys from damage and accumulation of dust.

While the invention has been described with respect to preferred embodiment, it is to be understood that the invention is not limited thereto, but, on the contrary, is intended to accommodate various modifications and equivalent arrangements included within the spirit and scope of the appended claims.

What is claimed is:

1. A collapsible keyboard, comprising:
   a connection part comprising a hook;
   a top cover pivoted to the connection part;
   a first key assembly connected to the connection part and movable between a first position and a second position; and
   a second key assembly pivoted to the first key assembly, comprising a connecting portion, wherein the first key assembly is located at the first position when the collapsible keyboard is in an operating mode, and the second key assembly is located between the first key assembly and the top cover and the first key assembly is located at the second position when the collapsible keyboard is in a collapsed mode, and the hook is engaged with the connecting portion for positioning the second key assembly when the collapsible keyboard is in the operating mode.

2. The collapsible keyboard as claimed in claim 1, wherein the first key assembly comprises a plurality of first keys and the second key assembly comprises a plurality of second keys, and the second keys face the first keys when the collapsible keyboard is in the collapsed mode.

3. The collapsible keyboard as claimed in claim 1, wherein the first and second key assemblies are substantially located on the same level when the collapsible keyboard is in an operating mode.

4. The collapsible keyboard as claimed in claim 1, wherein the connection part comprises a first slot and the first key assembly comprises a rib disposed in the first slot, so that the first key assembly is movable between the first position and the second positions.

5. The collapsible keyboard as claimed in claim 1, wherein the top cover comprises a protrusion and the first key assembly comprises a second slot, and the protrusion is slidably engaged with the second slot when the second key assembly is located between the first key assembly and the top cover.

6. The collapsible keyboard as claimed in claim 5, wherein the first key assembly comprises a first notch and the second key assembly comprises a second notch, and the first notch correspond the second notch when the first key assembly is disposed on the second key assembly.

7. The collapsible keyboard as claimed in claim 6, wherein the protrusion of the top cover passes through the first and second notches and to enter the second slot when the first key assembly is disposed on the second key assembly.

8. The collapsible keyboard as claimed in claim 2, wherein the first key assembly comprises a first edge irregularly formed by the first keys and the second key assembly comprises a second edge irregularly formed by the second keys and complementary to the first edge, wherein the first keys of the first edge E1 alternately correspond to the second keys of the second edge.

9. The collapsible keyboard as claimed in claim 1 further comprising a supporting plate pivoted to the top cover, so that the top cover is supported by the supporting plate with an inclined angle when the collapsible keyboard is in the operating mode.

10. The collapsible keyboard as claimed in claim 1, wherein the top cover comprises a circuit and an infrared receiver/emitter electrically connected to the circuit.

11. The collapsible keyboard as claimed in claim 10 further comprising an adjusting bar comprising at least two ends, wherein one end of the adjusting bar is rotatably disposed on the top cover, and the infrared receiver/emitter is disposed on the other end of the adjusting bar.

12. A collapsible keyboard, comprising:
a connection part;
a top cover pivoted to the connection part, the top cover comprising a protrusion;
a first key assembly connected to the connection part and movable between a first position and a second position, the first key assembly comprising a second slot; and
a second key assembly pivoted to the first key assembly, wherein the first key assembly is located at the first position when the collapsible keyboard is in an operating mode, and the second key assembly is located between the first key assembly and the top cover and the first key assembly is located at the second position when the collapsible keyboard is in a collapsed mode, and the protrusion is slidably engaged with the second slot when the second key assembly is located between the first key assembly and the top cover.

13. The collapsible keyboard as claimed in claim 12, wherein the first key assembly comprises a first notch and the second key assembly comprises a second notch, and the first notch correspond the second notch when the first key assembly is disposed on the second key assembly.

14. The collapsible keyboard as claimed in claim 13, wherein the protrusion of the top cover passes through the first and second notches and to enter the second slot when the first key assembly is disposed on the second key assembly.

* * * * *